(12) United States Patent
Cemic et al.

(10) Patent No.: US 6,943,901 B2
(45) Date of Patent: Sep. 13, 2005

(54) CRITICAL DIMENSION MEASURING INSTRUMENT

(75) Inventors: Franz Cemic, Weilmuenster (DE); Lambert Danner, Wetzlar-Naunheim (DE)

(73) Assignee: Leica Microsystems Semiconductor GmbH, Wetzlar (DE)

( * ) Notice: Subject to any disclaimer, the term of this patent is extended or adjusted under 35 U.S.C. 154(b) by 0 days.

(21) Appl. No.: 10/672,048

(22) Filed: Sep. 26, 2003

(65) Prior Publication Data

US 2004/0070821 A1 Apr. 15, 2004

(30) Foreign Application Priority Data

Sep. 28, 2002 (DE) ........................................ 102 45 473

(51) Int. Cl.[7] .............................................. G01B 11/14
(52) U.S. Cl. ...................................... 356/625; 359/621
(58) Field of Search ................................ 356/124–125, 356/621–622, 625; 359/618, 621, 630, 558, 727

(56) References Cited

U.S. PATENT DOCUMENTS

| | | | | |
|---|---|---|---|---|
| 5,359,440 A | * | 10/1994 | Hamada et al. ................ | 349/8 |
| 5,473,408 A | * | 12/1995 | Hoffman et al. ............... | 355/53 |
| 5,825,476 A | * | 10/1998 | Abitol et al. ................ | 356/124 |
| 5,982,563 A | * | 11/1999 | Nakamura et al. ........... | 359/727 |
| 6,046,856 A | * | 4/2000 | Takahashi et al. ........... | 359/621 |
| 6,155,686 A | * | 12/2000 | Hashizume ................... | 353/38 |
| 6,731,383 B2 | * | 5/2004 | Watkins et al. ........... | 356/237.2 |
| 2002/0001090 A1 | | 1/2002 | Cemic et al. ................ | 356/614 |

FOREIGN PATENT DOCUMENTS

| | | |
|---|---|---|
| DE | 10062579 | 6/2001 |
| JP | 05060982 | 3/1993 |
| JP | 2002023061 | 1/2002 |

* cited by examiner

Primary Examiner—Gregory J. Toatley, Jr.
Assistant Examiner—Sang H. Nguyen
(74) Attorney, Agent, or Firm—Davidson, Davidson & Kappel, LLC

(57) ABSTRACT

A critical dimension measuring instrument includes a light source, a beam-shaping optical system, a condenser having a condenser pupil, a first microlens array arrangement, a first auxiliary optical element having positive refractive power, a second auxiliary optical element having positive refractive power, and a second microlens array arrangement. The first microlens array arrangement, the first auxiliary optical element, the second auxiliary optical element and the second microlens array arrangement are arranged in successive fashion between the beam-shaping optical system and the condenser.

13 Claims, 4 Drawing Sheets

CRITICAL DIMENSION MEASURING INSTRUMENT

This application claims priority to German patent application 102 45 473.6, the subject matter of which is hereby incorporated by reference herein.

The invention concerns a critical dimension measuring instrument having a light source, a beam-shaping optical system and a condenser having a condenser pupil.

BACKGROUND

Critical dimension measuring instruments are used in the production of semiconductors to measure critical dimensions (cd), in order to check the dimensional consistency of features on semiconductor chips after the individual production steps, and to control the quality of the production steps. As packing densities on semiconductor chips steadily increase, the critical dimensions of the features to be measured are simultaneously becoming smaller and smaller. Requirements in terms of the specifications of measurement and inspection systems, e.g. the measurement accuracy and repeatability of measurement results, are becoming correspondingly more stringent.

Optical scanning methods and corresponding optical measurement apparatuses are preferred in production, even though the critical dimensions of the features to be measured are already smaller than the optical wavelengths used for measurement or inspection. The reason for this is that optical measurement apparatuses are substantially easier to use than non-optical ones. At the same time, however, the demands on optical measurement apparatuses are increasing, especially with regard to resolving power and the separation of adjacent features. The illumination quality of the features being examined plays a critical role here. To allow critical dimensions, edge profiles, and similar critical variables to be measured reproducibly using optical means, Fourier optics demands that the illumination of measurement fields, i.e. of the features acquired during measurement and their surroundings, be extremely homogeneous.

In known critical dimension measuring instruments, this is achieved using various kinds of illumination devices. In one type of illumination device, for example, gas discharge lamps are used as light sources, and the specimens to be examined are illuminated using classic Köhler illumination. The known gas discharge lamps exhibit near and far light intensity distributions that are unfavorable for critical dimension measurement (i.e. asymmetrical). These field distributions result, in the context of Köhler illumination, in an inhomogeneous illumination of the optical measurement field and the pupil. The "pupil" is defined in an incident-light illumination system as the objective pupil, and in a transmitted-light illumination system as the condenser pupil. As a result of the inhomogeneous and, in particular, oblique illumination, the critical dimensions that are measured depend on the position and orientation, within the optical measurement field, of the feature being measured. This has the disadvantage that the user's stringent requirements, in terms of reproducibility and measurement results that are independent of the feature's measurement position and orientation, cannot be met.

In other critical dimension measuring instruments, lasers are used as light sources. This has the disadvantage that the radiation emitted by the laser is almost completely coherent. This high level of coherency results in internal interference in the radiation field. This is perceptible, for example, as laser light granulation in the measurement field, and likewise has a negative effect on critical dimension measurements, making it impossible to achieve high reproducibility and measurement results that are highly independent of the feature's measurement position and orientation.

SUMMARY OF THE INVENTION

It is therefore an object of the present invention to provide a critical dimension measuring instrument that makes possible reproducible critical dimension measurements, independent of the feature's measurement position and orientation.

The present invention provides a critical dimension measuring instrument comprising:

- a light source,
- a beam-shaping optical system,
- a condenser having a condenser pupil,
- a first microlens array arrangement having microlenses, each microlens generating a divergent ray bundle that fills the condenser pupil,
- a first auxiliary optical element with positive refractive power, in whose focal plane the condenser pupil is located,
- a second auxiliary optical element with positive refractive power; and
- and a second microlens array arrangement having microlenses, whereby said first microlens array arrangement, said first auxiliary optical element, said second auxiliary optical element and said second microlens array arrangement are arranged successively between the beam-shaping optical system and the condenser.

A laser can be arranged as the light source, and a beam-spreading optical system as the beam-shaping optical system. Alternatively, the light source can be embodied as a gas discharge lamp and the beam-shaping optical system as a collector. In this case it is advantageous if additionally a spectrally effective filter system is provided which allows only the spectral component of the light source spectrum necessary for the particular measurement to pass. In this case the spectrally effective filter system is then arranged at the output of the collector.

The microlens array arrangement can comprise, for example, a plurality of identical hexagonal honeycomb-shaped, or square, microlenses. Alternatively, the microlens array arrangement can comprise two microlens arrays having cylindrical microlenses, each of which comprises a plurality of identical cylindrical microlenses, the two microlens arrays being arranged in crossed fashion with respect to the cylinder axes of the cylindrical microlenses. The microlens array arrangement can also be embodied as a microhoneycomb condenser.

The invention is based on the consideration that a reliable critical dimension measurement is possible only if a homogeneous field illumination on the specimen being examined, and an at least rotationally symmetrical intensity distribution in the condenser pupil, are present. The two conditions are a necessary prerequisite for a highly accurate optical critical dimension measurement. The reason for this is that any form of oblique illumination results in different measurement results at the left and the right edge of a feature, so that the difference calculation, i.e. the actual critical dimension determination, is always affected by an error. Based on these prerequisites—i.e. a homogeneous field illumination and an at least rotationally symmetrical intensity distribution in the pupil—it is possible to perform reproducible measurements of the width of microstructures and sub-microstructures almost irrespective of the position and orientation within the measurement field of the feature being examined. If, therefore, the disadvantages of illumination inhomogeneity known from the existing art are to be eliminated, the near- and far-field distributions of gas discharge lamps that are unfavorable for critical dimension measurements—or analogously, in the case of illumination using a laser, the intensity differences resulting from laser light granulation in the measurement field—must be homogenized.

For that purpose, the critical dimension measuring instrument according to the present invention comprises a two-step homogenization in the illumination, so that an illumination on the Köhler principle, which exhibits a homogeneous field illumination simultaneously with a rotationally symmetrical intensity distribution in the pupil, is present. Since the particular edge of a feature to be measured for the critical dimension measurement is positioned in the measurement field, the rotationally symmetrical intensity distribution in the condenser pupil ensures that measurement can occur under the same intensity and illumination conditions for both falling and rising edges, i.e. for example the left and right edges of a feature. The present critical dimension measuring instrument thus makes possible, for the first time, a measurement of critical dimensions that can be performed irrespective of the position within the measurement field of the feature being examined, and irrespective of the orientation in the measurement field of the feature being examined.

BRIEF DESCRIPTION OF THE DRAWINGS

The invention will be described in detail below with reference to the schematic drawings, in which.

DETAILED DESCRIPTION

Figure 1:
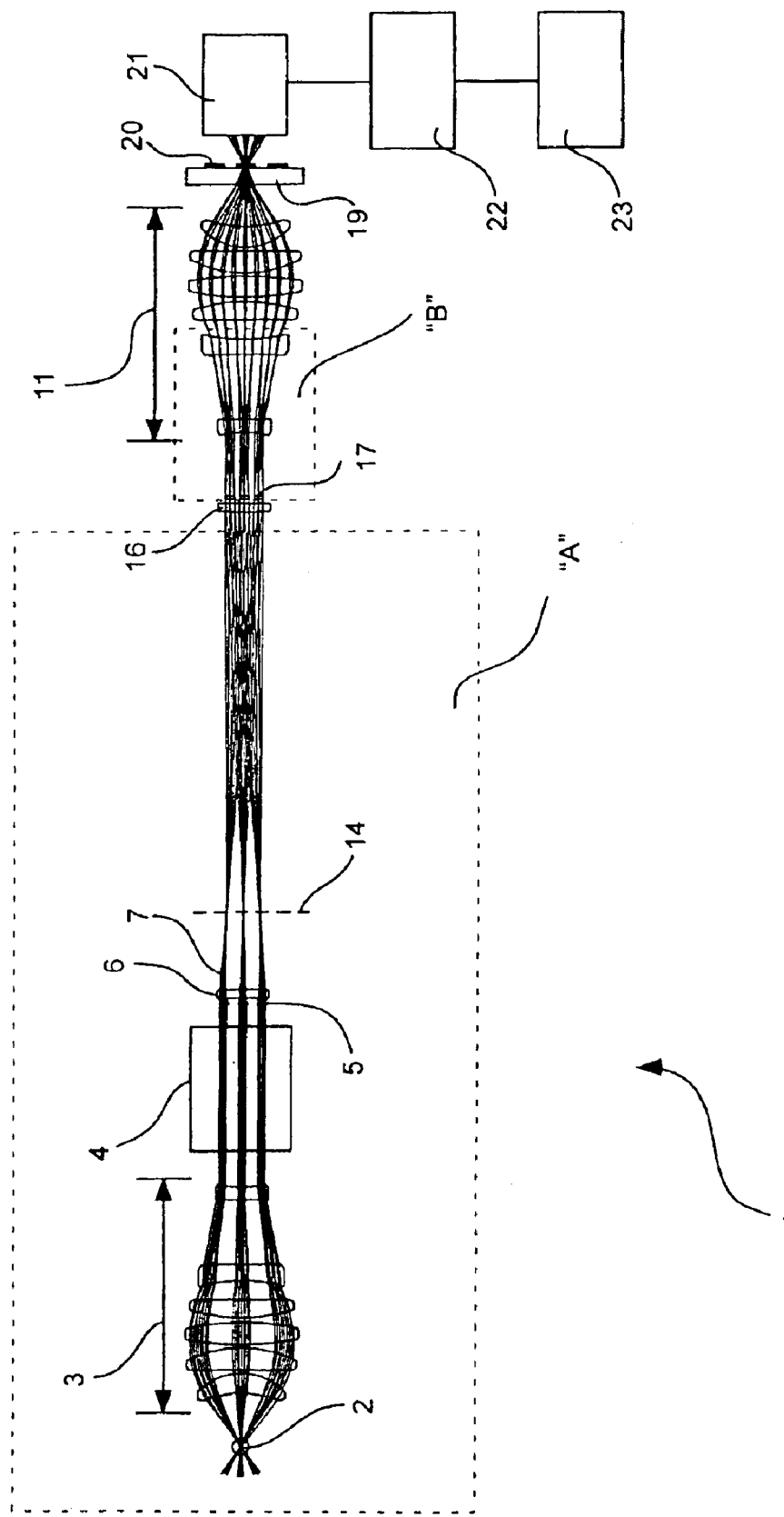
FIG. 1 shows a critical dimension measuring instrument having a gas discharge lamp as the light source.
Figure 2:
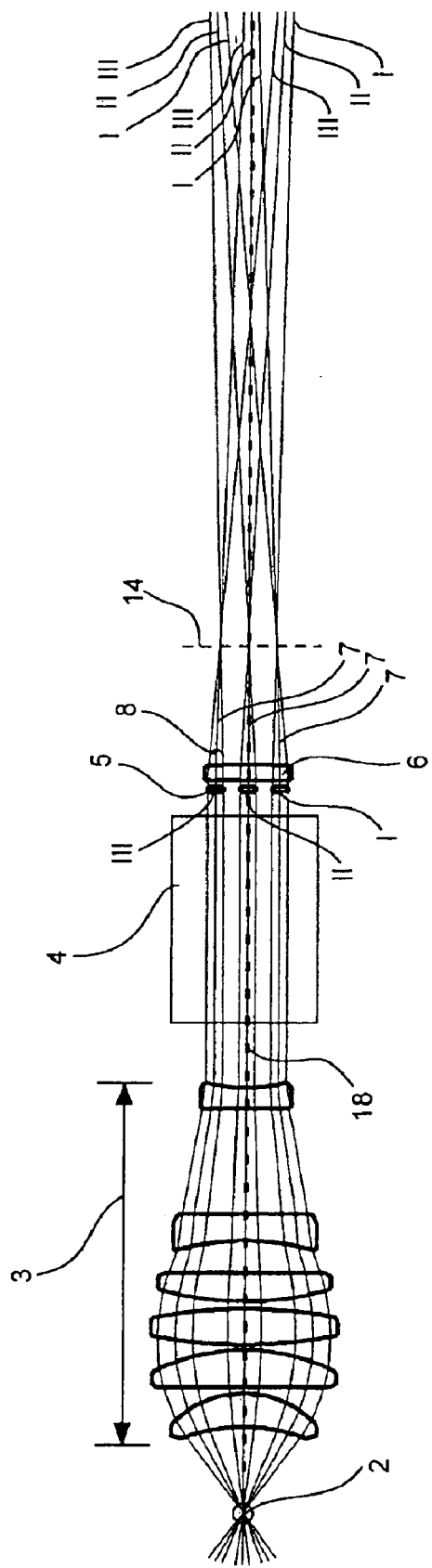
FIG. 2 is an enlargement of detail "A" of FIG. 1 showing the first illumination homogenization section.

FIG. 1 schematically shows the optical configuration of a critical dimension measuring instrument 1 having a field and pupil homogenization system according to the present invention based on Köhler illumination. In the present embodiment, a gas discharge lamp is provided as light source 2. The light emitted by the gas discharge lamp is collected by a collector 3. Light source 2 sits at the focus of collector 3 and therefore images the luminous plasma at infinity. Arranged in the beam path after collector 3 is a spectrally effective filter system 4 that filters out the spectral component of the gas discharge lamp spectrum intended for illumination. Arranged after filter system 4 is a first microlens array arrangement 5, and after that a first auxiliary optical element 6 with positive refractive power. FIG. 2 shows an enlargement of detail "A" of FIG. 1 containing this first illumination homogenization section, which will be described in more detail below.

First microlens array arrangement 5 can be a refractive or diffractive microlens array, or also a combination of two or more such arrays. The individual microlenses can have, for example, a hexagonal or also a square contour. The microlenses can each be embodied as converging or diverging lenses. It is also conceivable to arrange two microlens arrays, each having cylindrical microlenses, in a crossed orientation with respect to one another. For reasons of illustrative clarity, only three microlenses I, II, and III of first microlens array arrangement 5 are depicted. This is therefore merely a schematic reduction to three microlenses, whereas the microlens array that is actually provided comprises a plurality of microlenses. In first microlens array arrangement 5 used here, as in known microlens arrays, the individual microlenses are identical.

Figure 3:
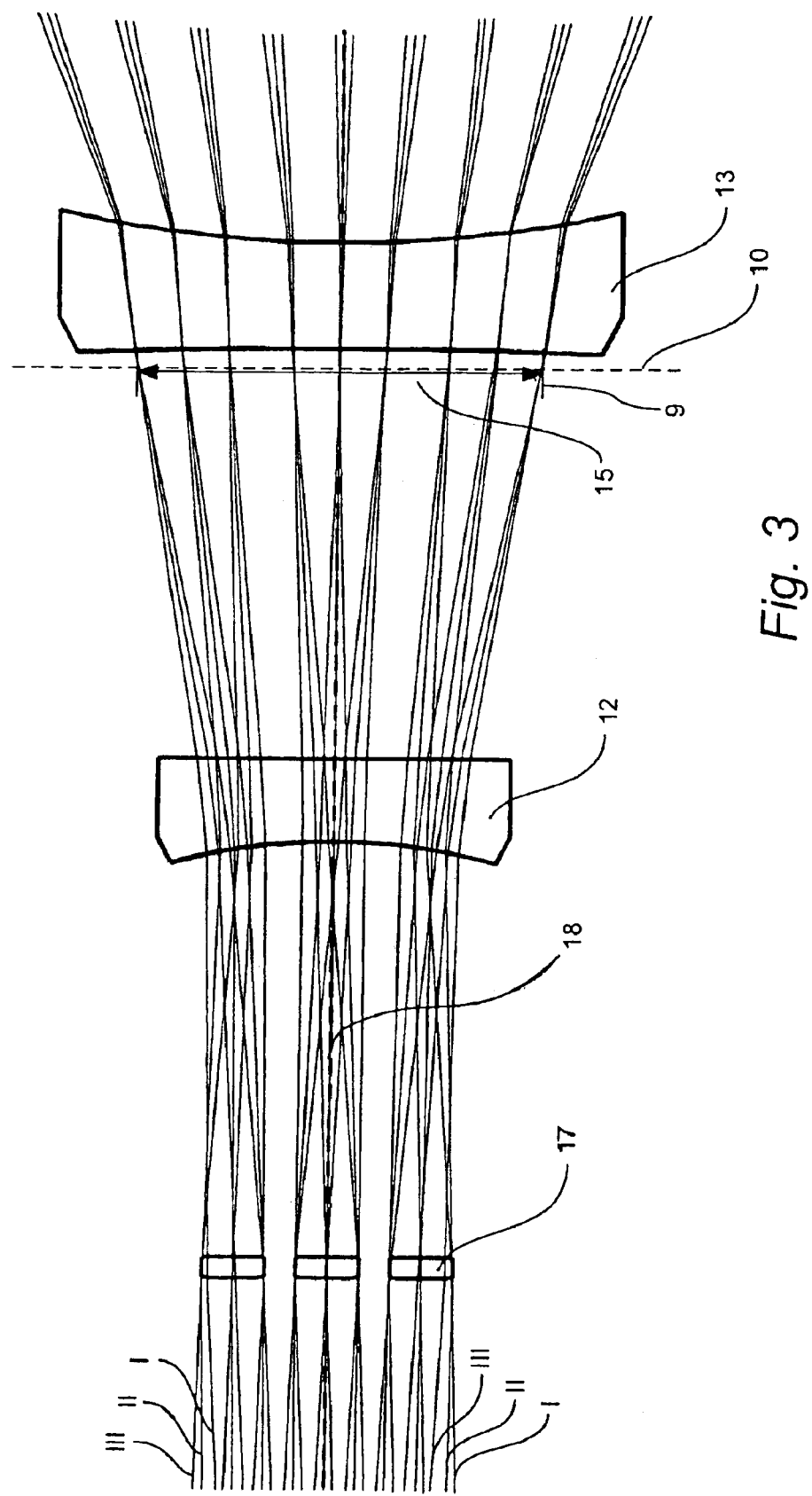
FIG. 3 is an enlargement of a further detail "B" of FIG. 1 showing the second illumination homogenization section.

Each microlens I, II, and III generates a conical ray bundle 7 having a beam angle 8 that is referred to hereinafter as the "divergence angle" or simply the "divergence." This divergence is selected in such a way that ray bundle 7 proceeding from each microlens I, II, and III completely illuminates condenser pupil 9 in condenser pupil plane 10 of condenser 11. The location of condenser pupil plane 10 with condenser pupil 9 is depicted in FIG. 3, which is an enlargement of detail "B" of FIG. 1. It is apparent from this that in the embodiment of condenser 11 used here, condenser pupil plane 10 lies between first condenser lens 12 and second condenser lens 13. For illustrative purposes in FIG. 2 and FIG. 3, the rays depicted by way of example that proceed from microlenses I, II, and II of first microlens array arrangement 5 are similarly labeled I, II, and III.

The divergence of ray bundle 7 is determined by the refractive power of the individual microlenses I, II, and III. The refractive power of the individual microlenses, and therefore the divergence, is selected so that the distance from condenser-side focal plane 14 of first microlens array arrangement 5 to condenser pupil 9, multiplied by the tangent of half the divergence angle 8, is greater than or equal to radius 15 of condenser pupil 9.

Without first auxiliary optical element 6, the individual convergent or divergent ray bundles 7 that proceed from the individual microlenses I, II, and III would all exhibit the same beam angle 8 (i.e. the same divergence), but would arrive in condenser pupil plane 10 with different lateral offsets. As a result of this offset, components of ray bundles 7 would be incident outside condenser pupil 9. This would result in a loss of light intensity and a brightness falloff at the edge of condenser pupil 9.

To prevent this, all the ray bundles 7 proceeding from microlenses I, II, and III are directed onto condenser pupil 9 by means of first auxiliary optical element 6. A first auxiliary optical element 6 with positive refractive power is used for this purpose. The focal length of first auxiliary optical element 6 is substantially equal to the distance between first auxiliary optical element 6 and condenser pupil 9. As a result, the center rays of ray bundles 7 proceeding from the individual microlenses I, II, and III, which before first auxiliary optical element 6 still run parallel, are now, after first auxiliary optical element 6, directed convergently into the center of condenser pupil 9. In other words, the area illuminated in condenser pupil plane 10 is somewhat larger than the condenser pupil itself. For reasons of clarity, however, FIG. 3 shows condenser pupil 9 as merely filled rather than overfilled, since the latter would require depicting a substantially greater number of rays.

The plurality of microlenses causes an intensity averaging, and thus a homogenization of the intensity distribution in condenser pupil 9. Intermediate images of the luminous plasma of the gas discharge lamp (i.e. of light source 2) are produced in the vicinity of condenser-side focal plane 14 (i.e. the focal plane) of the individual microlenses of first microlens array arrangement 5. The number of these intermediate images corresponds to the number of microlenses I, II, and III.

These intermediate images are imaged in multiple and respectively offset fashion, by means of a second auxiliary optical element 16 with positive refractive power and a second microlens array arrangement 17, into condenser pupil 9, i.e. into condenser pupil plane 10. For simplification, once again only three microlenses of second microlens array arrangement 17 are depicted schematically in FIG. 1 and FIG. 3, even though a plurality of microlenses is in fact present.

The effect of second auxiliary optical element 16 is to align the center rays of the divergent ray bundles proceeding from the intermediate images (located in focal plane 14). Before second auxiliary optical element 16, the center rays of these individual ray bundles extend divergently; and they are aligned by second auxiliary optical element 16 parallel to optical axis 18 (shown in FIG. 2 and FIG. 3) of the overall system. Second microlens array arrangement 17 is oriented in such a way that each ray bundle proceeding from an intermediate image strikes a microlens of second microlens array arrangement 17.

Figure 4:
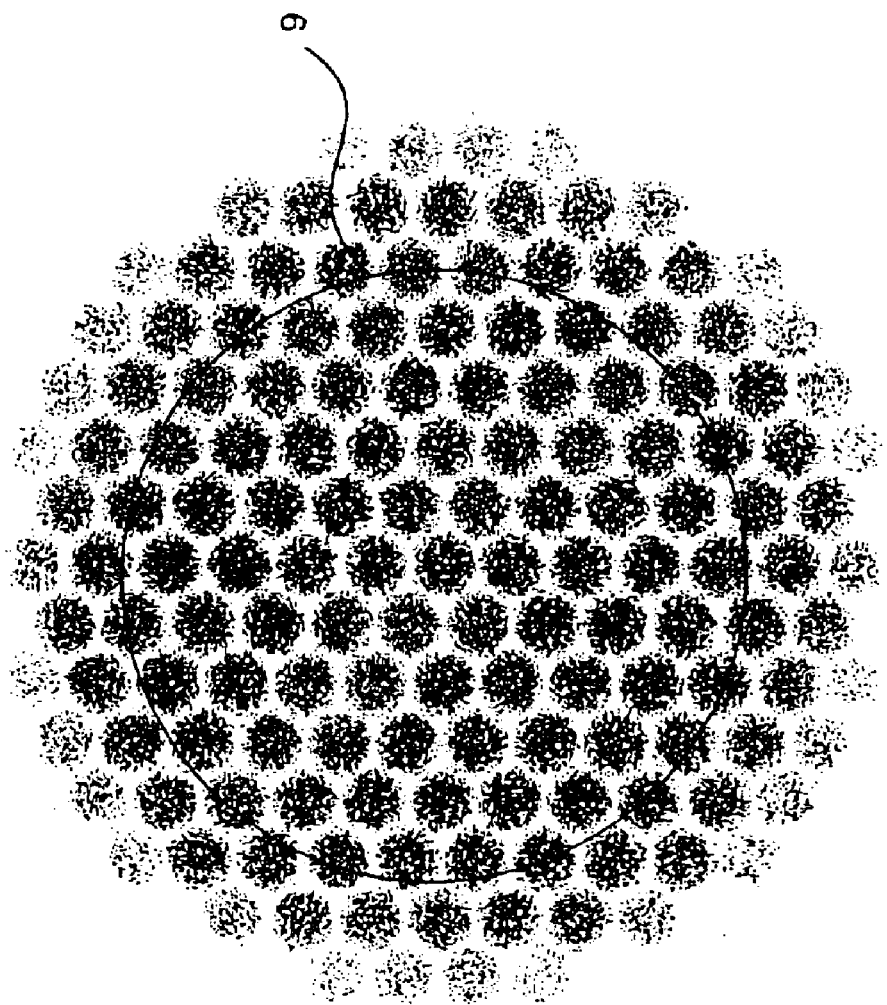
FIG. 4 shows the intensity distribution in the pupil.

The divergence of the individual microlenses of second microlens array arrangement 17 determines the size of the illuminated homogeneous field on specimen 19. In graphic terms, this means that a small beam angle for the individual ray bundles arriving in condenser pupil plane 10 results in a small homogeneously illuminated field on specimen 19 whose features 20 are to be measured. Analogously, a large beam angle (i.e. a large divergence) for the individual ray bundles arriving in condenser pupil plane 10 results in a large homogeneously illuminated field on specimen 19 to be measured, but at a lower intensity than in the case of the small field. The size of the illuminated object field is therefore determined by appropriate selection of the focal lengths of the microlenses of second microlens array arrangement 17. The second multiple imaging operation achieved with second auxiliary optical element 16 and second microlens array arrangement 17 causes field homogenization of the light intensity. The intensity distribution in condenser pupil 9 shown in FIG. 4 is thereby obtained. As already described, condenser pupil 9 is slightly overfilled.

The divergence of second microlens array arrangement 17 and the focal length of condenser 11 thus determine the size of the illuminated field on specimen 19. The divergence of second microlens array arrangement 17, i.e. of the microlenses of that second microlens array arrangement 17, is preferably selected so that the object field to be illuminated is slightly overilluminated.

As depicted in FIG. 1, specimen 19 is a transparent substrate on whose surface, shown at the right, features 20 to be examined are applied. This specimen can be, for example, a mask for semiconductor production. The optical examination is therefore performed in transmitted light. Features 20 to be examined are located at the focus. An imaging optical system 21 images the features of specimen 19 onto an image acquisition device 22 which can be, for example, a camera. The images acquired by image acquisition device 22 are transferred to an image evaluation device 23, which determines from the images the critical dimensions of features 20. Image evaluation device 23 can encompass, for example, a computer with the relevant software.

PARTS LIST

1 Critical dimension measuring instrument
2 Light source
3 Collector
4 Filter system
5 First microlens array arrangement (MLA)
6 First auxiliary optical element
7 Ray bundle
8 Beam angle=divergence angle
9 Condenser pupil
10 Condenser pupil plane
11 Condenser
12 First condenser lens
13 Second condenser lens
14 Condenser-side focal plane of first MLA
15 Radius of condenser pupil
16 Second auxiliary optical element
17 Second microlens array arrangement (MLA)
18 Optical axis
19 Specimen
20 Features
21 Imaging optical system
22 Image acquisition device
23 Image evaluation device
I, II, III Microlenses and their associated rays

What is claimed is:

1. A critical dimension measuring instrument comprising:
    a light source;
    a beam-shaping optical system;
    a condenser having a condenser pupil;
    a first microlens array arrangement including a plurality of first microlenses, each of the first microlenses being configured to generate a respective divergent ray bundle that fills the condenser pupil;
    a first auxiliary optical element having positive refractive power, the condenser pupil being disposed in a focal plane of the first auxiliary optical element;
    a second auxiliary optical element having positive refractive power; and
    a second microlens array arrangement including a plurality of second microlenses;
   wherein the first microlens array arrangement, the first auxiliary optical element, the second auxiliary optical element and the second microlens array arrangement are disposed in successive fashion between the beam-shaping optical system and the condenser.

2. The critical dimension measuring instrument as recited in claim 1 wherein the light source includes a laser and the beam-shaping optical system includes a beam-spreading optical system.

3. The critical dimension measuring instrument as recited in claim 1 wherein the light source includes a gas discharge lamp and the beam-shaping optical system includes a collector.

4. The critical dimension measuring instrument as recited in claim 3 further comprising a spectrally effective filter system configured to allow only a spectral component of a spectrum of the light source necessary for a particular measurement to pass.

5. The critical dimension measuring instrument as recited in claim 4 wherein the spectrally effective filter system is disposed at an output of the collector.

6. The critical dimension measuring instrument as recited in claim 1 wherein the plurality of first microlenses includes a plurality of identical hexagonal honeycomb-shaped microlenses.

7. The critical dimension measuring instrument as recited in claim 1 wherein the plurality of second microlenses includes a plurality of identical hexagonal honeycomb-shaped microlenses.

8. The critical dimension measuring instrument as recited in claim 1 wherein the plurality of first microlenses includes a plurality of identical square microlenses.

9. The critical dimension measuring instrument as recited in claim 1 wherein the plurality of second microlenses includes a plurality of identical square microlenses.

10. The critical dimension measuring instrument as recited in claim 1 wherein the first microlens array includes a third and a fourth microlens array each including a plurality of identical cylindrical microlenses, the third and fourth microlens arrays being disposed in crossed fashion with respect to respective cylinder axes of the cylindrical microlenses.

11. The critical dimension measuring instrument as recited in claim 1 wherein the second microlens array includes a fifth and a sixth microlens array each including a plurality of identical cylindrical microlenses, the fifth and a sixth microlens arrays being disposed in crossed fashion with respect to respective cylinder axes of the cylindrical microlenses.

12. The critical dimension measuring instrument as recited in claim 1 wherein the first microlens array arrangement includes a micro-honeycomb condenser.

13. The critical dimension measuring instrument as recited in claim 1 wherein the second microlens array arrangement includes a micro-honeycomb condenser.

* * * * *